April 13, 1965
J. B. MAERKER ETAL
3,178,486
CATALYTIC HYDRODEALKYLATION OF ALKYL
SUBSTITUTED BENZENOID HYDROCARBONS
Filed Sept. 5, 1962
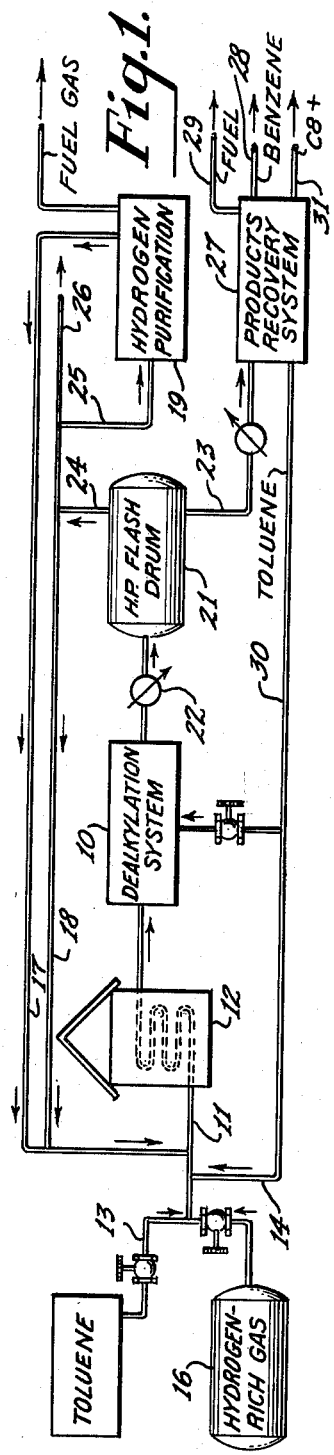
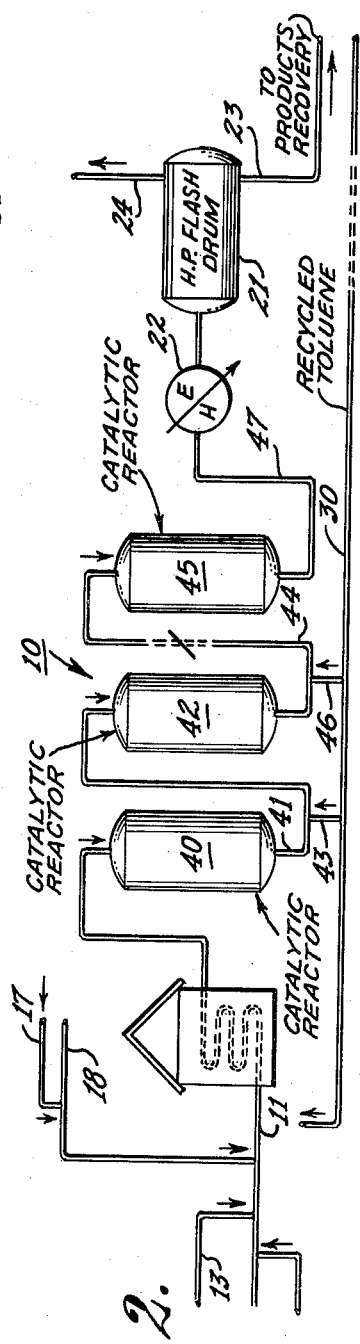
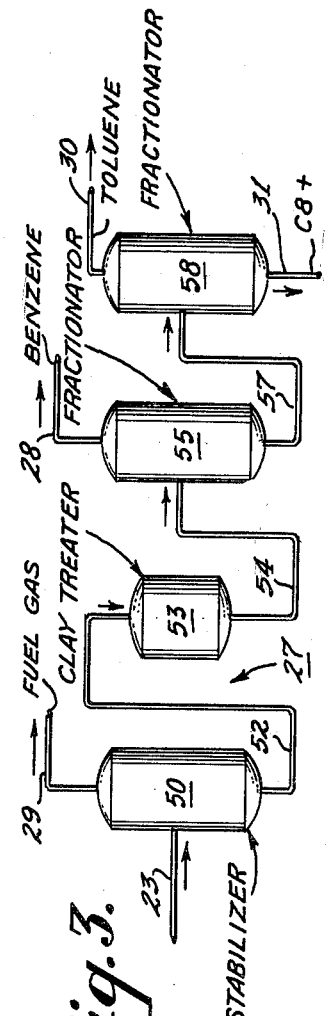
INVENTORS.
John B. Maerker
& Alvin H. Weiss
BY
ATTORNEY.

United States Patent Office 3,178,486
Patented Apr. 13, 1965

3,178,486
CATALYTIC HYDRODEALKYLATION OF ALKYL SUBSTITUTED BENZENOID HYDROCARBONS
John B. Maerker, Secane, Pa., and Alvin H. Weiss, Wilmington, Del., assignors to Air Products and Chemicals, Inc., Philadelphia, Pa., a corporation of Delaware
Filed Sept. 5, 1962, Ser. No. 223,866
11 Claims. (Cl. 260—672)

The present invention relates to the catalytic hydrodealkylation of alkyl substituted benzenoid hydrocarbons having 7 to 8 or more carbon atoms and is more specifically concerned with dealkylation, particularly demethylation, of such hydrocarbons, especially as applied to the conversion of toluene to benzene. This application is a continuation-in-part of application, S.N. 79,905, filed December 30, 1960, now abandoned.

In previous times industrial demands for benzene, toluene and xylenes respectively have maintained a fairly close balance between demand and supply from various sources. Presently there is a shortage in benzene supply which could be met by dealkylation of alkyl substituted benzenoid hydrocarbons, provided that the economics of available processing were sufficiently attractive. Recent refinery operations particularly in reforming of petroleum hydrocarbons in the gasoline boiling range have provided a rich source of toluene beyond the market demand, which becomes available for demethylation to benzene.

Many operations are known in prior patented art and literature for the demethylation of methyl benzenes, but many of these suffer from such factors as comparatively low conversion rates or poor selectivity of the operation or both. The principal reaction involved is fairly simple and can be carried out thermally (in the absence of catalyst) as illustrated by the reaction of toluene with hydrogen:

$$C_6H_5 \cdot CH_3 + H_2 \rightarrow C_6H_6 + CH_4 \qquad (1)$$

At temperatures required for effecting the thermal conversion at significantly high rates (above 1225° F.), side reactions are also promoted, resulting principally in the formation of methane as well as ethane, propane, diphenyl, higher polymers thereof, and low molecular weight hydrocarbon gases possibly by the following suggested mechanisms:

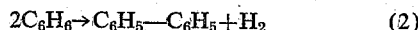
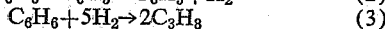
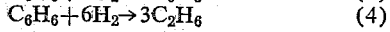

$$2C_6H_6 \rightarrow C_6H_5-C_6H_5 + H_2 \qquad (2)$$
$$C_6H_6 + 5H_2 \rightarrow 2C_3H_8 \qquad (3)$$
$$C_6H_6 + 6H_2 \rightarrow 3C_2H_6 \qquad (4)$$

Analogous mechanisms may also account for the formation of solids carbonaceous deposit (coke).

The formation of these side products, favored by higher temperature and/or increased reaction times to obtain a desired extent of conversion of the alkyl aromatic hydrocarbon, diminishes the yield of desired products (e.g., benzene). In order favorably to influence the reaction rate, the use of catalyst has been suggested to accelerate the desired principal reaction (demethylation to benzene) with a lower energy of activation and permitting lower reaction temperatures for a given reaction rate. For the catalyst to be of real practical benefit it should be selective to the extent that it does not accelerate the side reactions beyond acceptable limits, and it should have sufficiently high specific activity at the reduced temperatures to promote the principal reaction to the required extent. Many of the catalysts that have been suggested for this purpose, unfortunately, do not increase the reaction rate constant ($k_T$) for the principal reaction, as compared with that of the uncatalyzed reaction, sufficiently to enable the use of adequately lower reaction temperatures. For this reason catalytic hydrodealkylation processes designed for operation at average reactor temperatures above 1225° F. offer little, if any, advantage over the thermal operation. This is the case, for example, in connection with the catalysts proposed in British Patent 637,595 to demethylate methyl benzene, wherein the suggested catalyst consists of activated alumina with or without hydrogen chloride. Also there has been advocated the use of catalysts such as silica-alumina or chromia-alumina and of such catalysts prepared in special manner; but such catalysts have fallen short of the goal, either because of the particular characteristics of the catalyst as such or, in certain instances, because these were not used under appropriate operating conditions at which the possible benefits of the catalyst could be fully realized.

A principal object of the present invention is to provide an improved catalytic process for hydrodealkylation of alkyl substituted benzenoid compounds, particularly those of 7 to 8 carbon atoms, which process is economically attractive for commercial utilization. To achieve this object catalyst and processing conditions are selected and controlled within certain designated limits whereby increased throughput of charge is achieved while maintaining high conversion levels and desirable selectivity in the reaction. Moreover, long non-interrupted on-stream periods approaching or exceeding several months or more are attained without necessitating regeneration or reactivation of the catalyst.

In accordance with the invention a hydrocarbon charge comprising one or more alkyl aromatics of 7 to 14 carbon atoms is contacted at superatmospheric hydrogen partial pressure with a specially prepared chromia-alumina catalyst of high specific activity under selected conditions, including controlled temperature and hydrogen to aromatics ratio, effecting rapid exothermic rise in temperature in the reaction zone which is ordinarily maintained below a maximum of 1200° F. The operating conditions are so selected, moreover, that the total residence time (based on the empty reactors) of the reactants in the catalytic zones lies generally in the approximate range of 30 to 150 seconds, and rarely requires as much as 180 seconds.

In the preferred practice of the invention the catalytic hydrodealkylation is effected in a series of separated reaction zones wherein reactant and reaction products in passing through are permitted in each zone to rise exothermically to an outlet temperature (based on the fresh high activity catalyst) above 1150° F. but short of 1225° F. The total vapor effluent from the first and each intermediate reaction zone is immediately cooled to an appropriate lower temperature before being admitted to the next succeeding reaction zone wherein the reactants are again reacted in the presence of catalyst and are thereby exothermically raised to the stated outlet temperature range. The repeated reactions with intermediate cooling are continued until at least 50% and preferably no less than 70% of the alkyl aromatics present in the initial charge are converted. Conversion of up to about 85% of the charge is practically feasible under the described operating conditions in a series of 2 to 3 catalytic reaction zones with intermediate cooling. If higher conversion levels, as above about 90%, are desired it is preferred to employ a larger number of reaction zones.

It will be understood that the extent of conversion of the alkyl aromatic feed and the composition of the reaction products (product distribution) are governed by selection or control of the process variables utilized in the operation. These variables include:

(1) The total residence time of the reactants in the catalytic zones;
(2) The rate at which fresh hydrogen-containing gas is introduced;
(3) The purity of the fresh hydrogen-containing gas;
(4) The gross rate at which gas, separated from the ultimate liquid products, is recycled to the reaction;

(5) The purity or hydrogen concentration of the recycled gas;
(6) The total pressure maintained in the system;
(7) The maximum temperature of the reaction zones;
(8) The specific nature and activity of the catalyst employed; and
(9) The inlet temperature of the charge to each reactor.

Factors #2 to #5 taken with factor #6 essentially establish the hydrogen partial pressure of the system. A hydrogen level should be maintained such that there is provided at all times in the reaction zones a mole ratio of hydrogen to total aromatics of no less than 3:1 and preferably at least 4:1. Since part of the introduced hydrogen is used up in the reaction and the hydrocarbon partial pressure is being simultaneously increased by the formation of methane and other hydrocarbon vapor or gas products, the total pressure and composition of the charge at the inlet to the first reactor should generally be such that the hydrogen partial pressure is at least 350, and preferably 400, pounds per square inch.

Under these conditions the described operation can be carried out with a coke production level, in the convertion of toluene to benzene, maintained considerably below 0.1% coke per day deposited per weight of catalyst. The attainment of this unusually low coke level, because of the nature of the selected catalyst and the operating conditions utilized, including high hydrogen to aromatics ratio, is important not only from the standpoint of the immediate benefits in the yield of recovered valuable liquid product, but also and more importantly, from the standpoint of enhanced uninterrupted on stream periods of operation and the maintenance of high catalyst activity levels during such periods as a result of the low coke content.

The total pressure in each reaction zone of the system may be varied widely, but generally is maintained at above 500 pounds per square inch gauge. In some instances, pressures going up to about 1500 pounds per square inch gauge may be employed.

The indicated temperature range is an important factor in the practice of the invention. At temperatures below about 1000° F. the reaction rate for the catalyzed reaction of a toluene feed while several times above that of that found for the thermal (uncatalyzed) reaction is still rather slow. With increasing temperature the reaction rate of the catalyzed reaction approaches that of the uncatalyzed reaction, so that in the range above about 1300° F. comparatively little benefit is being obtained by use of the catalyst. In the intermediate temperature range (about 1100–1200° F.) the reaction rate (which increases exponentially with temperature) becomes sufficiently high, yet there is a significant spread between the rate of the catalyzed reaction and the uncatalyzed reaction, which difference is utilized to beneficial and practical advantage.

The reaction rate also depends upon the activity of the catalyst employed. Accordingly, while for the particular catalyst used in the described operation, reaction temperatures in the range of 1100–1200° F. are recommended, this temperature range applies while the catalyst has an activity characteristic of the catalyst in its fresh unused state. With continued operation over comparatively long periods, as catalyst activity ultimately begins to decline (permanently as a result of aging and/or temporarily from coke accumulation) it may be found desirable to raise the maximum operation temperature to some extent, as up to about 1225° F., to compensate for the lower conversion levels due to reduced activity of the catalyst, but in doing so, some sacrifice in product distribution selectivity is to be expected.

The inlet temperature of the charge to each reactor in the system is selected so as to approach but not exceed the predetermined maximum temperature desired at the reactor outlet considering the expected exothermic temperature elevation produced in the reaction. Ordinarily, under the preferred range of operating conditions the inlet temperature will be above 950° F. and preferably in the range of 1000–1100° F., so that the exothermic reaction takes place without exceeding the indicated maximum. The size of the several reaction zones or reactors of the series and the quantity of catalyst therein need not be equal. The temperature to which the products from a preceding reaction zone are cooled before admission to the next reactor will therefore be governed by the extent of the expected temperature rise therein.

The nominal residence time of the hydrocarbon charge depends not only on the throughput rate but also upon the temperature and partial pressure in the reaction zone. This interrelation is expressed, for an empty reactor, by the formula:

$$\theta = \frac{MW(P)}{DL(1+G)T}\left[\frac{3600}{R}\right] \quad (5)$$

in which $\theta$ is the reaction time in seconds
MW is the molecular weight of the aromatic hydrocarbons charged
P is the total absolute pressure
L is the liquid hourly space velocity of the charge
D is the density of the aromatic hydrocarbons charged
G is the mol ratio of gas to aromatic hydrocarbon
T is average absolute temperature in the reactor, and
R is the appropriate gas constant It will be appreciated that if the residence time is prolonged, aromatic hydrocarbons in the charge or those formed as intermediate reaction products, have greater opportunity to form light gases, dimers and higher molecular weight polymers, as well as solid hydrocarbonaceous residues, at the expense of desired aromatic liquid products. For this reason it is desirable that the space rate be correlated with the other operating conditions utilized so that the residence time is maintained preferably in the range of 30 to 120 seconds and not be permitted to exceed about 180 seconds.

As has already been indicated above, catalysts effective in hydrodealkylation, differ significantly in activity and selectivity, even though of the same general type or of the same general chemical composition. To obtain the desired practical advantages in practice of the invention there should be employed a catalyst which primarily increases the reaction rate at the low temperatures employed at the reactor inlet so that the exothermic temperature increase does not exceed the stated outlet limits, whereby the reaction can be carried out effectively and at practical throughput rates at reduced temperatures (significantly below that required for the thermal reaction). In thus being able to operate at the lower temperature levels, improved selectivity can be achieved. The preferred catalysts utilized in practice of the present invention exhibit at temperatures in the vicinity of 1100° F. a reaction rate constant ($k_T$) which is almost five times that of the uncatalyzed reaction. Typical chrome-alumina catalysts of about the same chrome content that have been suggested or used in production of olefins, as well as those suggested in hydroforming operations, show at this temperature level reaction rate constants no more than about twice that of the thermal reaction. At higher temperatures these differences among catalysts become progressively smaller. The important consideration, however, is that with the catalysts heretofore advocated for hydrodealkylation of methyl benzenes, one must go to unfavorably higher temperature levels to attain the same conversion as that exhibited at 1150–1170° F. (outlet temperatures) by the catalysts of the invention. While such required increase in temperature does not appear too great numerically, it should be remembered that the benzene yields obtained at the required higher temperature for any given conversion level are essentially lower and are accompanied by increased production of degradation products including coke and low molecular weight gas.

The chromia-alumina catalyst employed in the present invention can be characterized by certain unique properties. Typical commercial chrome-alumina catalyst (#1 in Table I below) of the type that has been employed in dehydrogenation for production of butylene and butadiene contains about 20% by weight $Cr_2O_3$, and is prepared by impregnation of activated alumina of commerce (gamma alumina) with chromic acid. Another commercially available form of chrome-alumina catalyst (#2) is that made from a stabilized hard alumina base containing about ½ to 1% bentonite as stabilizer. The alumina base is prepared by mulling alpha alumina trihydrate with aqueous nitric acid and impregnating the dried and calcined pellets extruded from this mass. Catalyst designated #3 in the tabulation below is that used in the present invention. It has approximately the same chrome content as the previously described catalysts. The method of preparing such catalyst is hereinafter described.

Each of the above described catalysts was employed, after a suitable break-in period, in the dehydrogenation of butane at an absolute pressure of 5″ Hg and at several different temperatures and space rates; the conversion obtained (butane disappearance) and the respective yields of olefins and diolefins were recorded as well as the production of coke and hydrocarbon gas ($C_1$ to $C_3$). Each of these catalysts was then subjected to an accelerated aging treatment in a vapor stream of air containing 20% steam for 2 or more hours at 1600° F. and each again tested as before in dehydrogenation repeating each previous run at the same conditions. The following effects were noted:

equation for a 1.5 order reaction. The general equation for the 1.5 order reaction in the conversion of toluene to benzene may be written $$-\frac{dC_t}{d\theta} = k_T C_t (C_H)^{1/2} \quad (6)$$

in which
$C_t$ = gram mols of toluene per cm.$^3$
$C_H$ = gram mols of hydrogen per cm.$^3$
$\theta$ = time in seconds
$k_T$ = rate constant expressed as $$\left(\frac{cm.^3}{gram\ mol}\right)^{1/2} (sec.^{-1})$$

To obtain the desired conversion at temperatures below 1200° F. at which a low coke deposition is maintained, the catalyst must exhibit a high rate constant as defined by the equation $$k_T = A \cdot e^{\left(\frac{-E}{RT}\right)} \quad (7)$$

in which $A$ = frequency factor expressed as $$\left(\frac{cm.^3}{gram\ mol}\right)^{1/2} (sec.^{-1})$$

$E$ = activation energy expressed as cal./mol
$R$ = gas constant expressed as cal./° K./mol
$T$ = absolute temperature in degrees K.

At $T = 873°$ K., $k_T$ for the defined catalyst is in the approximate range of 0.5 to 0.6.

There has also been proposed for use in dealkylation certain chromia-alumina catalysts containing 30% or more by weight of $Cr_2O_3$ prepared by coprecipitation

TABLE I

| Catalyst | #1 | | | | #2 | | | | #3 | | | |
|---|---|---|---|---|---|---|---|---|---|---|---|---|
| Temp., °F | 1,100 | 1,100 | 1,000 | 1,000 | 1,100 | 1,100 | 1,000 | 1,000 | 1,100 | 1,000 | 1,100 | 1,000 |
| Space rate, LHSV | 1 | 2 | 1 | 2 | 1 | 2 | 1 | 2 | 1 | 2 | 1 | 2 |
| Conv., wt. percent | 60.4 | 45.6 | 29.2 | 19.7 | 54.2 | 37.6 | 26.1 | 16.0 | 72.8 | 56.8 | 42.3 | 28.7 |
| Coke, wt. percent | 2.6 | 1.1 | 0.7 | ------ | 1.9 | 0.8 | 0.3 | ------ | 4.7 | 2.3 | 1.0 | 0.5 |
| Gas, wt. percent | 6.3 | 3.6 | 1.1 | ------ | 5.6 | 3.0 | 1.0 | ------ | 8.4 | 5.1 | 1.5 | 0.6 |
| Conv. activity, ($A_f$=C/1−C)* | 1.5 | .85 | .41 | ------ | 1.2 | .6 | .35 | ------ | 2.6 | 1.3 | .74 | .405 |
| $A_s$* | 1.25 | ------ | ------ | ------ | 1.00 | ------ | ------ | ------ | 2.17 | ------ | ------ | ------ |
| After steaming: | 2 hours | | | | 4 hours | | | | | | | |
| Conv., wt. percent | 39.6 | 26.9 | 16.5 | ------ | 37.8 | 25.3 | 14.0 | 8.2 | 66.9 | 50.5 | 34.3 | 23.6 |
| Coke, wt. percent | 3.0 | 1.4 | 0.3 | ------ | 2.5 | 1.3 | 0.5 | ------ | 4.2 | 1.9 | 0.4 | 0.2 |
| Gas, wt. percent | 5.2 | 2.8 | 1.0 | ------ | 5.8 | 3.5 | 1.7 | ------ | 8.5 | 4.9 | 1.7 | 0.9 |
| ($A_u$=C/1−C)* | .66 | .37 | ------ | ------ | .61 | .34 | ------ | ------ | 2.0 | 1.02 | .54 | 1.3 |

*$A_s$ = Relative activity at 1,100° F., 5″ Hg absolute and 1 LHSV.
$A_f$ = Conversion activity of fresh catalyst.
$A_u$ = Conversion activity of aged or used catalyst.
C = Wt. percent conversion divided by 100.

The characteristic high activity of the chrome-alumina catalysts used in practice of the present invention is illustrated by catalyst #3 in the above table. These preferred catalysts have a relative activity ($A_s$) of 2 or more as determined by conversion of butane under standardized test conditions (1100° F., 5″ Hg, and 1 space rate) in fresh state. These catalysts retain such high activity over relatively long periods of use as evidenced by their indicated activity even after severe steaming.

It will also be seen from the foregoing table that catalyst #3 is unique in comparatively low gas production at high conversion levels and in the fact that the coke making characteristic thereof is reduced with catalyst aging at the indicated severity levels.

The activity and selectivity of the chrome-alumina catalyst is defined above in terms of its ability to promote dehydrogenation of butane. A more fundamental designation of the catalyst quality can be expressed in terms of the rate constant ($k_T$) based on the Arrhenius (cogelation) of the components. These catalysts, however, suffer from the drawback of producing at desired high conversion levels inordinately large quantities of coke in the operation, in the order of 10 or more times that made at the same conversion levels with catalysts of the present invention.

The catalysts used in practice of the present invention are made by dehydration of an alumina hydrate composition containing at least 50%, preferably in excess of 75% beta trihydrate. After adjusting the surface area by heat treatment of the dehydrated material to in the range of 80 to 300 square meters per gram, it is impregnated with chromic acid in an amount furnishing 15 to 25% $Cr_2O_3$ by weight of the finished catalyst, followed by drying and calcining. The calcined chrome-alumina catalyst has a surface area of about 50 to 150 square meters per gram.

The operation of the invention and certain additional advantages thereof will be understood from the description which follows read in connection with the accompanying drawings, wherein:

FIGURE 1 is a highly simplified schematic flow diagram of the system employed in practice of the invention;

FIGURE 2 is a flow diagram illustrating in further detail the particular arrangement of the dealkylation system utilized in the preferred practice of the invention; and FIGURE 3 is a flow diagram of the products recovery system.

As illustrated in the drawings (FIG. 1), there is sent to the dealkylation system indicated generally at 10 a combined stream of toluene or other alkyl substituted benzenoid hydrocarbons together with hydrogen-rich gas of required purity. The combined stream 11 passes through suitable heaters and heat exchangers generally indicated at 12 wherein it is brought to the required inlet temperature at which it is introduced into the dealkylation system. As indicated, the combined stream comprises fresh aromatic hydrocarbon charge 13 and recycled aromatic hydrocarbon 14. The feed of hydrogen-rich gas is made up of fresh hydrogen-rich gas from a suitable supply source 16, a recycled stream of purified hydrogen-rich gas 17 and an additional stream of recycled hydrogen-rich gas 18 which bypasses the gas purification system generally indicated at 19.

The fresh charge 13 may be, for example, a toluene fraction or an equilibrium $C_8$ alkyl aromatic fraction; or, in some instances, mixtures of $C_7$ to $C_{14}$ aromatics and particularly $C_7$ to $C_{12}$ aromatics. One of the principal uses to which the invention is to be applied is in the production of high purity benzene from toluene; in which instance the feed 13 could comprise toluene of fairly good purity; for example, "nitration grade" toluene. The process is also applicable to impure aromatic feeds such as coke-oven-derived toluene fractions that have not been acid-washed. If desired, the disclosed procedure may even be employed to convert naphthalene homologs to pure naphthalene. Use of the instant procedure for converting dicyclic compounds such as naphthalenes, indenes, and indanes, tricyclic compounds such as fluorenes and anthracenes, and sulfur compounds such as thionaphthane and tolyl mercaptan is dependent principally upon economic considerations.

Various sources are available for supply of the hydrogen-rich gas 16. This gas need not be of extremely high purity but preferably should contain about 80% or more of hydrogen and may be accompanied by other gases which are not incompatible in the conversion process, such as low molecular weight hydrocarbons. A convenient source for the supply of the hydrogen-rich gas is that obtained as a by-product in the reforming of naphtha. Of course, except for the added cost, the greater the hydrogen purity the better.

Instead of premixing the hydrogen rich gas with the aromatic hydrocarbon feed outside of the dealkylation system, it will be understood that these can be admitted through separate lines into the initial dealkylation reactor, with provision for separate heating and compression. The effluent from the dealkylation system 10 is sent to a high pressure flash drum 21, being cooled enroute by suitable heat exchange as indicated at 22. From the bottom of the flash drum 21 there is withdrawn at liquid product 23 which is sent to recovery. The overhead gaseous product 24 is divided into two streams 18 and 25, the latter going through the gas purification system indicated at 19. To maintain a substantially constant gas volume a portion of the gas from 24 is discharged as indicated at 26 to be replaced in the system by the supply of fresh gas from 16. In the gas purification system removed contaminants are discharged as fuel while the purified hydrogen gas is recycled to the system through line 17.

Various types of hydrogen purification units are well known to the art. Suitable for use in the present arrangement is a gas-separation unit designed to remove hydrocarbon gases from hydrogen. One form of available commercial unit for such purification of hydrogen gas utilizes molecular sieves of the chabazite or synthetic zeolite type in the 4–5 angstrom pore size range which preferentially adsorb low molecular weight normal hydrocarbons while passing hydrogen. The particular purification system per se forms no part of the present invention. The proportionate split in gas sent through the purification unit 19 and that recycled through line 18 will be governed by the quantity and quality of fresh hydrogen gas available and the hydrogen purity desired to be maintained in the total gas supplied to the dealkylation system. It will be understood that the higher the purity and quantity of the fresh hydrogen gas supplied from source 16 the greater the portion of gas that can by-pass the gas purification system 19, to maintain any given hydrogen concentration.

The products recovery system 27 is designed to separate out from the flash effluent 23 the desired product or products. Thus, in the case of a toluene charge which is converted chiefly to benzene, there is recovered the desired high purity benzene 28, separated from gases and vapors lighter than benzene which may be carried over into the recovery system through line 23; the latter being discharged as fuel 29. From the products boiling above benzene a toluene cut is recovered and recycled through line 30 supplying feed line 14 for further dealkylation, while hydrocarbons boiling above toluene, such as $C_8$ and higher hydrocarbons, are separately discharged through line 31.

The arrangement of the dealkylation system is shown in FIGURE 2. The preheated aromatic hydrocarbon charge combined with the unconverted recycled aromatic hydrocarbons and the recycled hydrogen-rich gas to which has been added the make up gas, is sent to the first reactor 40 of the system, through which it is passed over a fixed bed of catalyst of the type and under the operating conditions previously described. The total reaction effluent leaves the reactor by line 41 enroute to the next reactor of the series 42. Since in reactor 40 the hydrocarbons have been brought to approximately the top of the desired temperature range, provision is made for cooling the products in line 41. One manner of acccomplishing such cooling, as illustrated, involves the direct injection, as indicated at 43, of at least a portion of the recycled products from line 30 which are at a temperature below that of the products in line 41. The products in line 30 do not differ substantially in composition from the fresh hydrocarbon charge in the case of a system designed for hydrodealkylation of toluene, so that one may employ in line 43 part of the fresh hydrocarbon charge in line 13 instead of or in addition to the recycled hydrocarbons from line 30. Ordinarily, sufficient excess of hydrogen-rich gas in introduced into the first reactor 40 so that no adjustment of the hydrogen to oil ratio entering reactor 42 need be made to accommodate the additional charge sent thereto from line 43; however, if adjustment in the ratio of gas to oil is desired this can readily be accomplished by including in the charge to reactor 42 a portion of the recycle gas from lines 17 and 18.

The precooled charge in reactor 42 again passes over a bed of catalyst under substantially the same operating conditions as before, except for the inherent changes due to the slight pressure drop encountered in the previous reactor and the slight possible changes in gas to oil ratio. In reactor 42, as a result of the ensuing exothermic reaction, the products are again brought up to a temperature within the desired reaction range and leave through line 44 enroute to the next succeeding reactor 45, and so forth. The effluent in line 44 is again cooled by the quench hydrocarbons injected through line 46 to provide the desired inlet temperature utilized in reactor 45.

While direct injection of normally liquid hydrocarbons similar in composition to that of the feed of the first reactor 40 has been indicated in the illustrated operation, it will be understood that other means for cooling the hydrocarbon products between reactors may be utilized as desired. As one alternative, for example, one may employ as quench liquid a portion of the cooled recovered benzene from line 28 (FIGURE 1). As another alternative, indirect heat exchange may be used instead of direct injection of quench material.

While in the particular illustration a system employing three reactors is shown, it will be understood that a larger or smaller number may be employed with suitable adjustment of conditions as to the extent of conversion desired to be accomplished in each reactor. A single reactor zone may be employed particularly for operations designed for low conversion levels, but it has been found that greater flexibility and better control of the operation with the production of superior product distribution particularly at increased conversion levels is best obtained by the use of several reactors with intermediate cooling. It is not necessary that separate reaction vessels be employed in the system utilizing intermediate cooling. Separate reaction zones can be provided in a single vessel in the form of beds of catalyst spaced from one another with the provision of means for intermediate cooling between the catalyst beds which thus operate as separate reaction zones.

From the last reactor 45 of the series, the reaction products are passed by means of line 47 through heat exchanger 22 wherein they are cooled to a temperature in the range of 50 to 100° F. and the cooled products sent to the high pressure flash drum 21 to separate gases from normally liquid products; the liquid products being passed by means of line 23 to an appropriate recovery system.

A preferred form of recovery system in illustrated in FIGURE 3. The cooled liquid effluent in line 23 enters a stabilizer vessel 50 wherein additional gaseous products are flashed off as overhead 29 which may be recovered as fuel gas and the liquid products 52 sent to distillation. Desirably the effluent in line 52 is passed through a clay treater 53 for the removal of any trace quantities of olefinic materials or polymeric carbonaceous contaminants prior to fractionation. The clay treater may be filled with the usual inorganic adsorptive mass such as clay, bauxite, fuller's earth, synthetic alumina-silicates, or the like. Operation in the clay treater is at a temperature in the order of 300 to 375° F. and pressures 10 to 30 atmospheres and liquid hourly space velocity in the order of 1 to 6.

The effluent from the clay treater passes by means of line 54 to the distillation tower 55 operated under appropriate conditions to distill off as overhead a narrow boiling benzene fraction 28 of high purity (typically 99.95%) while the higher boiling materials are withdrawn as liquid by means of line 57 and charged to a second distillation column 58 operated under suitable conditions to distill off an overhead of toluene to be recycled to hydrodealkylation through line 30, the undistilled higher boiling product being withdrawn through line 31 as already described. Instead of recycling only the toluene fraction from 58, there may also be included in the recycle stream 30 a portion of higher boiling aromatics such as those in the $C_8$ range.

While in the foregoing description emphasis has been placed for purposes of simplifying the description, on the hydrodealkylation of toluene, it will be understood that substantially the same type of operation is involved in the treatment of a $C_8$ benzenoid charge, with the recovery of products including benzene containing only 0.2 p.p.m. thiophene and, if desired, toluene, and recycling of the remaining unconverted aromatics. Since the first methyl group of a xylene can be removed more readily than the methyl group of toluene, high conversion levels of xylene to toluene are achieved under conditions of lower severity than are needed in the dealkylation of toluene to benzene.

*Example 1*

(A) "Nitration grade" toluene was passed over high activity chrome-alumina catalyst, hereinafter more fully described, in a system comprising three fixed bed reactors, under conditions set out below, each of said reactors containing approximately an equal amount of catalyst. The run was continued for 184 hours. Operating conditions and results are tabulated in column (a) below.

(B) The same charge stock was similarly converted at higher severity to obtain over 85% conversion. The conditions and results appear in column (b) below, showing yields during 46th hour of operation.

TABLE II

| Operating conditions | (a) | (b) |
|---|---|---|
| Total pressure, p.s.i.a. (at outlet of last reactor) | 800 | 1,000 |
| Hydrogen partial pressure, p.s.i.a. (at outlet of last reactor) | 500 | 650 |
| Make up hydrogen rate, mols/mol oil | 2.2 | 3.5 |
| Recycle gas rate, mol/mol | 5.0 | 3.8 |
| Recycle gas $H_2$ purity, mol percent | 70 | 74 |
| $H_2$/aromatic mol ratio (inlet) | 5.7 | 6.3 |
| Space rate, v./hr./v | 0.5 | 0.45 |
| Temperature, ° F.: | | |
| Reactor #1, inlet-outlet | 1,110–1,170 | 1,085–1,180 |
| Reactor #2, inlet-outlet | 1,120–1,165 | 1,095–1,175 |
| Reactor #3, inlet-outlet | 1,119–1,163 | 1,115–1,173 |
| Nominal residence time, secs | 71 | 100 |
| Yields and results: | | |
| Conversion, wt. percent toluene charged | 70 | 87.8 |
| Molal selectivity to benzene per 100 mols toluene converted | 96.5 | 94.8 |
| Coke produced, wt. percent feed | .0004 | .0016 |
| $C_8+$ hydrocarbons,* wt. percent feed | 1.6 | 2.2 |

*The quantity reported in the table includes all residual materials left after distilling off hydrocarbons boiling through the range of unconverted toluene, about 50–70% of which residue is constituted by aromatic dimers and higher polymers, the remainder being largely di- and trialkyl benzenes which can be recovered by further distillation and recycled for dealkylation if desired.

The catalyst used in the foregoing example was prepared as follows:

Commercial alumina trihydrate powder (loss on ignition of dried power=35.0%) containing approximately 80% beta trihydrate and about 0.5% sodium (as $Na_2O$), was thoroughly admixed by mulling with aqueous nitric acid employing approximately .087 part nitric acid (42° Bé.) and 0.07 part of water by weight of the alumina trihydrate. The mixing was continued for 30 minutes and the obtained mix extruded through a die plate to form approximately 3.2 mm. pellets (when calcined). The extruded and cut pellets were dried at 240° F. for two hours followed by air calcination for one hour at 800° F. The calcined pellets were then subjected to surface area adjustment by treatment in steam for four hours at 1100° F., bringing the area down to about 150 m.²/g.

An aqueous solution of chromic acid was prepared by dissolving chromic oxide in water to form a solution having a specific gravity of 1.561 (at 15° C.) and to each 10 volumes of such solution there was added 3.17 volumes of aqueous sodium hydroxide solution of 1.031 specific gravity (at 20° C.). The mixed solutions were cooled to 10° C. and the area adjusted alumina pellets impregnated therewith by soaking in the mixed solution to give 20 parts by weight $Cr_2O_3$ for each 80 parts $Al_2O_3$ (approximately 1 liter of solution per kilogram of pellets). The temperature during impregnation was held at approximately 25° C. The soaked pellets were thoroughly drained, dried for two hours at 270° F. and then calcined at 1400° F. for four hours in a mixture of 80% air and 20% steam, followed by an additional four hours at the same temperature in 80% hydrogen and 20% steam. The finished pellets had a surface area of about 85 m.²/g.

The hydrogen treatment is not necessary in practical operation but was employed here to simulate used catalyst.

For this catalyst the $k_T$ value (at 873° K.) is equal to approximately 0.602. The $k_T$ value for the non-catalytic reaction of this temperature is 0.144.

*Example II*

Runs made over the same catalyst in a single reactor vessel obtained an average conversion of 77% by weight of toluene charged, at a 95–96% selectivity to benzene, under the following operating conditions:

| | |
|---|---|
| Total pressure, p.s.i.a. | 1185 |
| Hydrogen partial pressure, p.s.i.a. | 756 |
| Make-up $H_2$ rate, mol/mol oil | 3.0 |
| Recycle gas rate, mol/mol oil | 2.8 |
| Recycle gas purity, percent $H_2$ | 76 |
| Space rate, v./hr./v. | 0.52 |
| Temp., ° F., inlet-outlet | 983–1193 |
| Residence time, secs. | 144 |
| $C_8$+hydrocarbons, wt. percent chg. | 3.1 |

In utilizing a single reactor, higher hydrogen pressure and increased residence time are required to obtain 77% conversion than in the case of a multiple reactor system.

*Example III*

Charge:

| | |
|---|---|
| Wt. percent toluene | 64.6 |
| Wt. percent $C_8$ aromatics | 34.6 |

Operating conditions:

| | |
|---|---|
| No. reactors | 3 |
| Temperature, ° F., inlet-outlet— | |
|   Reactor #1 | 1060–1175 |
|   Reactor #2 | 1100–1175 |
|   Reactor #3 | 1110–1175 |
| Residence time, sec. | 64 |
| Space rate, v./hr./v. | 0.5 |
| Total pressure at outlet, p.s.i.g. | 800 |
| $H_2$ pressure at outlet, p.s.i.g. | 500 |
| Fresh $H_2$, mol./mol. arom. chg. | 3.5 |
| Recycled gas, mol./mol. arom. chg. | 4.8 |
| Purity recycle gas, percent $H_2$ | 70 |

Yields, wt. percent of charge:

| | |
|---|---|
| Benzene | 54.6 |
| Toluene | 24.6 |
| $C_8$ aromatics | 1.1 |
| Other liquid HC | 1.2 |
| $H_2$ | 5.5 |
| $C_1$–$C_5$ hydrocarbons | 20.8 |
| Coke | 0.001 |
| Benzene selectivity, mol. percent of converted aromatics | ~96 |

*Example IV*

The following comparison between thermal and catalytic conversion indicates that a thermal reactor operating at the same temperature level as a catalytic reactor would have to be over three times the size of the catalytic reactor to obtain the same 70% conversion of a charge comprising nitration grade toluene.

| | |
|---|---|
| Maximum outlet temperature, ° F. | 1,175 |
| Pressure, p.s.i.g. | 850 |
| Recycle gas/total feed, mol/mol | 11.34 |
| $H_2$/aromatic at outlet, mol/mol | 5 |
| Number of reactors | 2 |
| Recycle toluene/fresh feed, mol/mol | .43 |

| | Thermal | Catalytic |
|---|---|---|
| Conversion, percent | 70 | 70 |
| Contact time, sec | 206.2 | 67.3 |

The use of higher temperatures for the purpose of obtaining thermal conversion at faster rates promotes the formation of methane as well as other undesirable side reactions:

$$C_6H_6 + 9H_2 \rightarrow 6CH_4 \tag{8}$$

The formation of methane predominantly rather than ethane and propane results in a substantially higher requirement for hydrogen in thermal conversion as compared to catalytic conversion.

Obviously, many modifications and variations of the invention as hereinbefore set forth may be made without departing from the spirit and scope thereof, and therefore only such limitations should be imposed as are indicated in the appended claims.

What is claimed is:

1. The method for hydrodealkylation of alkyl aromatic hydrocarbons which comprises: contacting such hydrocarbons in a plurality of reaction zones with high activity chrome-alumina catalyst at a temperature in excess of 1100° F., the effluent from each said reaction zone being adjusted in temperature before entering the next succeeding reaction zone so that the reaction temperature in each zone as a result of the reaction exotherm therein is maintained below a maximum of 1225° F., the number of such zones being sufficient to effect the conversion of at least 50% by weight of said alkyl aromatic hydrocarbons charged and to provide a total contact time of 30 to 180 seconds, the reaction conditions in each zone including a hydrogen to aromatics ratio of at least 3 to 1; said catalyst containing 15 to 25% $Cr_2O_3$ incorporated in an alumina base derived from dehydration of hydrous alumina containing at least 50% beta trihydrate.

2. The method of converting toluene to benzene which comprises passing the toluene through a bed of high activity chrome-alumina catalyst containing 15 to 25% $Cr_2O_3$, under conditions such that the vapor effluent at the outlet of said bed is at a temperature of about 1200° F., cooling said vapor effluent and passing the cooled vapors through at least one additional bed of such catalyst under conditions to raise the temperature of the vapor to about 1200° F., the number of such beds being sufficient to provide a total contact period of 30 to 150 seconds, the toluene being charged to said first reaction zone with added hydrogen in amount to provide a hydrogen to aromatics ratio of at least 4 to 1, the catalyst employed being characterized by a conversion activity of at least 2, as determined by conversion of butane under test conditions including 1100° F. temperature, 5 inches mercury absolute pressure and 1 space rate.

3. The method for hydrodealkylation of alkyl substituted benzenoid hydrocarbons having 7 to 14 carbon atoms which comprises: contacting the same with high activity chrome-alumina catalyst under selected process conditions including temperature in the range of 1000–1225° F. and a hydrogen to aromatics ratio of at least 3 to 1; said process conditions being correlated with space rate of the charge to provide a reaction time ($\theta$) of 30 to 180 seconds, as determined by the formula:

$$\theta = \frac{MW(P)}{DL(1+G)T}\left[\frac{3600}{R}\right]$$

wherein:

$\theta$ is reaction time in seconds based on empty reaction space,

MW is the average molecular weight of the aromatic hydrocarbons charged,

P is the total absolute pressure,

L is the liquid hourly space velocity of the aromatic charge,

D is the density of the aromatic hydrocarbon charge,

G is the mol ratio of gas to aromatic hydrocarbons,

T is the average absolute temperature in the reaction zone and

R is the appropriate gas constant;

and said catalyst containing 15 to 25% $Cr_2O_3$ prepared by impregnating an activated alumina of 80 to 300 meters square/gram surface area with an aqueous solution of a decomposable chromium compound, wherein said activated alumina is the product obtained by calcination of hydrous alumina containing at least 50% by weight beta trihydrate.

4. The method for hydrodealkylation of an alkyl aromatic hydrocarbon having 7 to 12 carbon atoms, which comprises the steps of:
(A) introducing such hydrocarbon into a first catalytic reaction zone;
(B) passing the hydrocarbon through said reaction zone under reaction conditions and time sufficient to effect exothermic temperature elevation thereof to an outlet temperature of about 1200° F.;
(C) discharging reaction effluent vapors from said first reaction zone including reaction products and unconverted aromatic hydrocarbon;
(D) cooling such discharged vapors by direct quenching with recycled hydrocarbon;
(E) passing the thus cooled vapors, including the recycled hydrocarbon, into and through a subsequent catalytic reaction zone under reaction conditions and time sufficient to effect exothermic temperature elevation thereof to an outlet temperature of about 1200° F.;
(F) discharging the vapor products from the last such catalytic reaction zone;
(G) cooling the products from step F;
(H) fractionating the cooled products from step G to separate therefrom
  (1) a desired aromatic hydrocarbon material having a lower number of carbon atoms than that charged in step A for recovery, and
  (2) a residual hydrocarbon fraction of higher boiling point than the hydrocarbon so recovered;
(I) recycling at least part of said residual hydrocarbon fraction in cool state to serve as direct quench in step D; steps D and E being carried out for a sufficient number of times to effect the conversion of at least 50% of the original alkyl aromatic hydrocarbon charged in step A and provide a total contact time of 30 to 180 seconds, and the reaction conditions in steps B and E including a hydrogen to aromatics ratio of at least 3 to 1; the catalyst employed in each of said catalytic reaction zones containing 15 to 25% $Cr_2O_3$ incorporated in an alumina base derived by dehydration of hydrous alumina containing at least 50% beta trihydrate.

5. The method in accordance with claim 4 wherein said alkyl aromatic hydrocarbon charged in step A is toluene.

6. The method in accordance with claim 4 wherein said recycled quench hydrocarbon comprises unconverted toluene.

7. The method in accordance with claim 4 wherein said alkyl aromatic hydrocarbon charged in step A comprises xylene.

8. The method of converting toluene to benzene which comprises:
(A) passing the toluene with hydrogen gas through a series of at least two successive catalytic reaction zones over high activity chrome-alumina catalyst and at conversion conditions;
(B) cooling the reaction products enroute from one such reaction zone to the next by introduction of cooled quench fluid;
(C) cooling and fractioninating the products from the last such reaction zone to separate a pure benzene fraction and a higher boiling hydrocarbon fraction comprising toluene;
(D) recycling at least part of said higher boiling hydrocarbon fraction as quench fluid to step (B); the conversion conditions in each of said catalytic reaction zone effecting exothermic reaction raising the temperature of the hydrocarbons therein to about 1200° F. and including at least a 3 to 1 hydrogen to aromatic mol ratio; the number of said reaction zones being sufficient to provide a total vapor residence time of 30 to 180 seconds; the catalyst containing about 20% $Cr_2O_3$ on alumina and having a conversion activity of at least 2 as determined by conversion of butane at 1000° F., 5 inches Hg absolute pressure and 1 space rate.

9. The method according to claim 8 wherein the outlet temperature from each of said reaction zones is in the range of 1150 to 1200° F., and the number of said reaction zones is sufficient to effect at least 70% conversion of the initial toluene charged.

10. The method according to claim 8 wherein the number of said reaction zones is sufficient to effect at least 85% conversion of the initial toluene charged.

11. The method according to claim 8 wherein the reaction products from the last such reaction zone are flashed to separate normally gaseous products therefrom, part of said normally gaseous products are directly recycled to the first such reaction zone and another part purified to increase hydrogen concentration therein prior to recycling thereof to the first reaction zone.

References Cited by the Examiner
UNITED STATES PATENTS

| | | | |
|---|---|---|---|
| 2,120,715 | 6/38 | Seguy | 208—59 |
| 2,692,293 | 10/57 | Heinemann | 260—672 |
| 2,857,440 | 10/58 | Amos et al. | 260—672 |
| 2,905,618 | 9/59 | McKinley et al. | 208—59 |
| 2,982,720 | 5/61 | Yeo et al. | 260—672 |

ALPHONSO D. SULLIVAN, *Primary Examiner.*

JOSEPH R. LIBERMAN, *Examiner.*

UNITED STATES PATENT OFFICE
CERTIFICATE OF CORRECTION

Patent No. 3,178,486                                  April 13, 1965

John B. Maerker et al.

It is hereby certified that error appears in the above numbered patent requiring correction and that the said Letters Patent should read as corrected below.

Columns 5 and 6, TABLE I, under the heading, Catalyst #3, column 2, line 1 thereof, for "1,000" read -- 1,100 --; same table, same heading, column 3, line 1 thereof, for "1,100" read -- 1,000 --; same TABLE I, in the after steaming section under the heading 4 hours, column 8, line 4 thereof, for "1.3" read -- .31 --; column 7, line 64, for "at" read -- a --; column 8, line 55, for "in" read -- is --; column 14, line 20, for "zone" read -- zones --.

Signed and sealed this 14th day of September 1965.

(SEAL)
Attest:

ERNEST W. SWIDER                                EDWARD J. BRENNER
Attesting Officer                                     Commissioner of Patents